Sept. 3, 1929.  C. M. MacCHESNEY ET AL  1,726,709
METHOD OF AND MEANS FOR LOADING FREIGHT CARS
Filed July 22, 1927  3 Sheets-Sheet 1

Inventors:
Chester M. MacChesney,
John E Kern Ott,
by Rector, Hibben, Davis
and Macauley, Attys.

Sept. 3, 1929.  C. M. MacCHESNEY ET AL  1,726,709
METHOD OF AND MEANS FOR LOADING FREIGHT CARS
Filed July 22, 1927  3 Sheets-Sheet 2
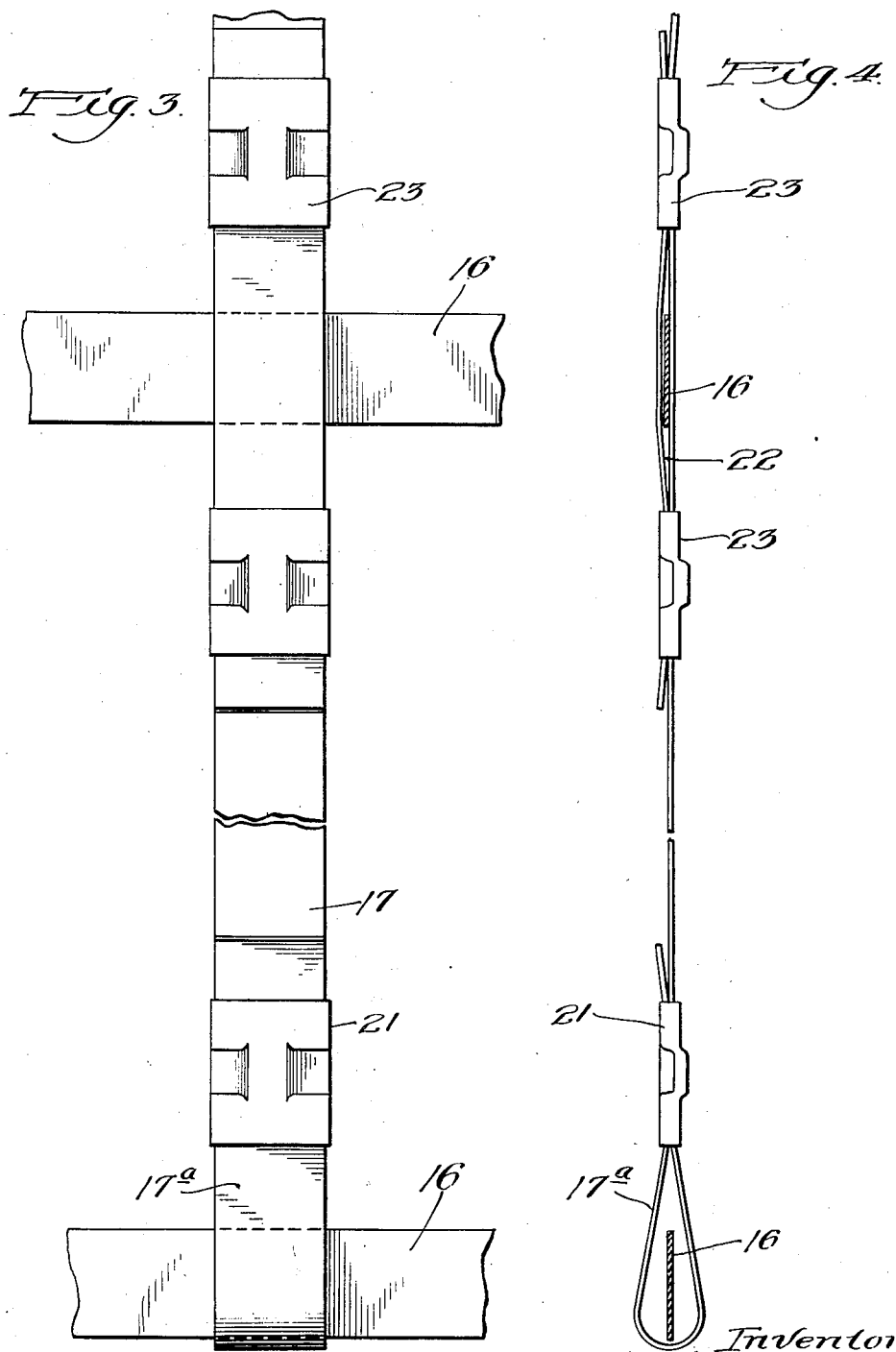
Inventors:
Chester M. MacChesney,
John E. Kern Ott.
by Rector, Hibben, Davis
and Macauley, Attys.

Patented Sept. 3, 1929.

1,726,709

UNITED STATES PATENT OFFICE.

CHESTER M. MacCHESNEY AND JOHN EKERN OTT, OF CHICAGO, ILLINOIS, ASSIGNORS TO ACME STEEL COMPANY, OF CHICAGO, ILLINOIS, A CORPORATION OF ILLINOIS.

METHOD OF AND MEANS FOR LOADING FREIGHT CARS.

Application filed July 22, 1927. Serial No. 207,621.

This invention relates to improvements in methods of and means for loading freight cars and this application relates to a modification of the invention described and claimed in our prior co-pending application, Serial No. 87,189, filed February 9, 1926.

According to said invention disclosed in said prior application, the various objects which are commonly loaded in freight cars and other carriers, such as barrels, boxes, bales and other containers are secured together in groups to form load units of sufficient weight and having sufficient frictional contact with the floor of the car to maintain themselves substantially against displacement without being rigidly secured to the car floor or the car walls. By means of that invention, a load unit of relatively large area is formed so that the frictional resistance of the load unit on the floor of the car, while permitting slight relative movemen of the load unit when shocks are imparted to the car, prevents such abnormal movement of the load as would cause damage to the car walls, the car floor, or the load itself, thereby overcoming the difficulties which have been encountered with previous methods of loading according to which an attempt was always made to secure the load rigidly to the car by the use of cleats, bracing, and the like. In our prior application above described we have disclosed the use of straps for securing individual elements of a load unit together and in the process of loading the straps are supported on the car, as shown in said application, by means of stays which extend upwardly from the car floor and which are held in place during the loading of the car by being attached to the inside walls of the car. When the straps are subsequently tightened around the individual elements of the load to form a large load unit, these stays move inwardly from the car walls and then support the straps by resting on the floor of the car.

The principal object of the present invention is to provide another method of and means for supporting the encircling straps which extend around the elements of the load unit. A further object of the invention is to provide a car loading method according to which encircling straps are held in position around the space to be occupied by the load by means of upwardly extending straps secured to the car walls or other supports, these upwardly extending straps serving as supports for the encircling straps after the latter have been drawn tightly around the individual elements of the load unit. A further object of the invention is to provide means for loading a car by the unit load method wherein the encircling flexible members by which the individual elements of the load are retained in a group with supporting means which derive their support from the elements of the load unit themselves. Other objects relate to various features of construction and arrangement such as will appear more fully hereinafter.

The nature of the invention will be understood from the following specification taken with the accompanying drawings in which certain embodiments of the invention are illustrated. In the drawings, Figure 1 shows a perspective view of the interior of one end of a freight car illustrating the encircling strap supported by one form of the improvement constituting the present invention, in readiness for the loading of the car with barrels;

Fig. 3 is an enlarged elevation showing the connection of the suspending straps with the horizontal encircling straps;

Fig. 4 shows a side elevation of the structure illustrated in Fig. 3;

Figure 5:
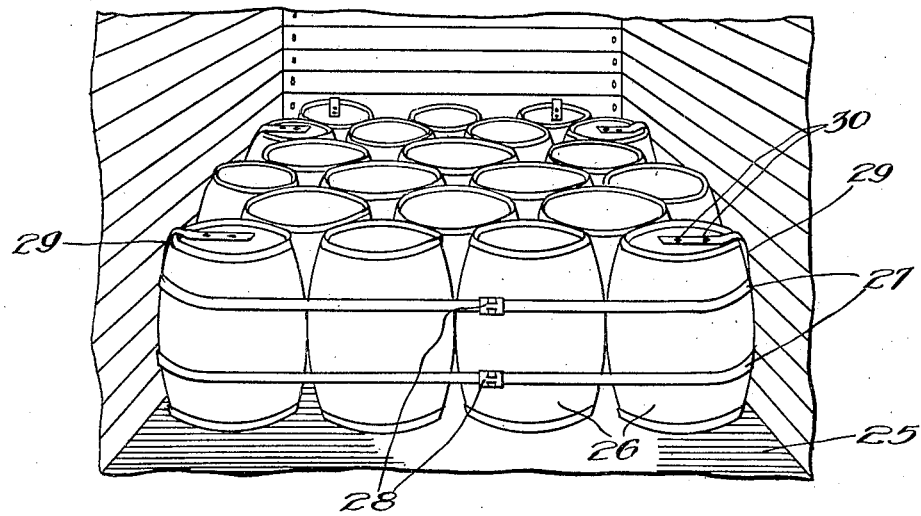
Figure 6:
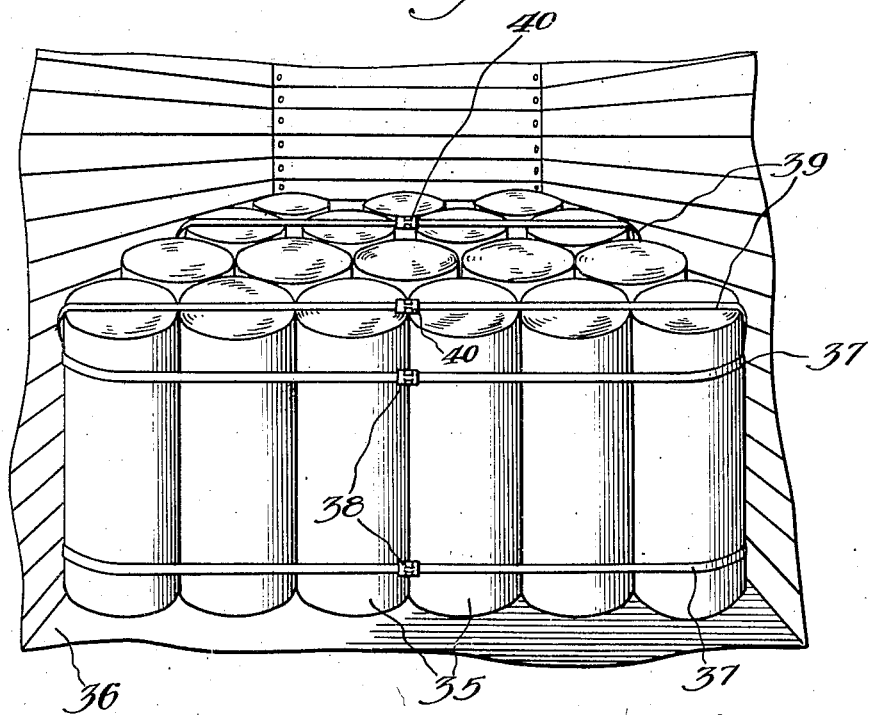

Fig. 5 is a perspective view of the interior of the car showing a load unit formed of a group of barrels with the suspending straps attached directly to the heads of the barrels; and Fig. 6 is a perspective view of the interior of a railway car showing a load unit formed of a plurality of rolls of paper mounted on their ends and having the encircling straps supported by suspending straps having their ends sealed together over the top ends of the bales.

Figure 1:
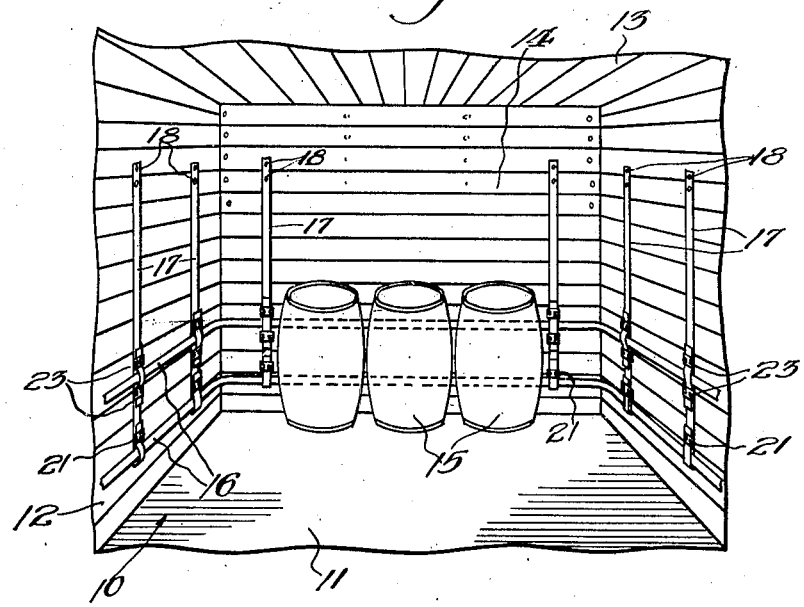
Figure 2:
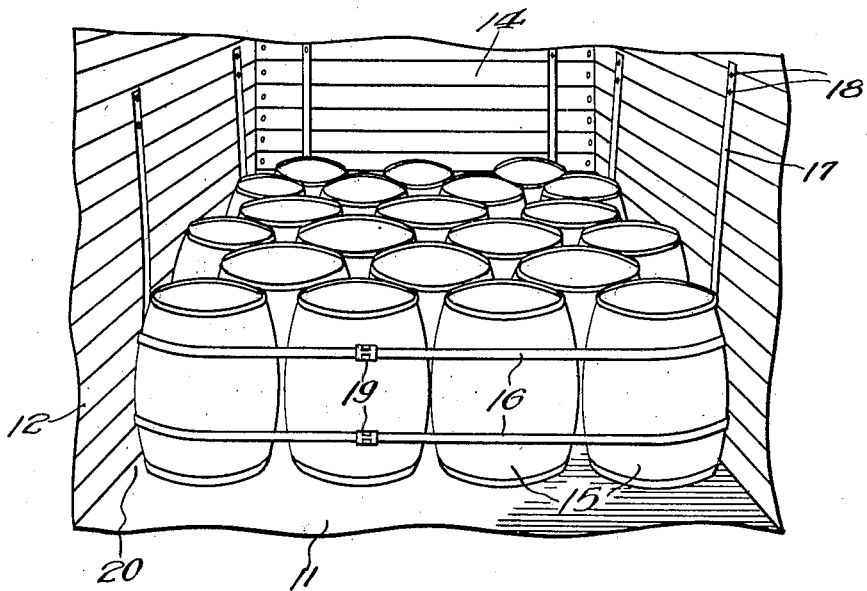
Fig. 2 is a perspective view showing the same interior view of the car after the load unit of barrels has been formed and after the encircling straps have been tightened and sealed in place, the suspending straps being still attached to the car walls.

Referring to Fig. 1 of the drawings, there is illustrated the interior of a freight car 10 having a floor 11, side walls 12, and a roof or ceiling 13, all connected by the end walls 14. Before loading the car with a group of barrels 15 containing material to be shipped, the end portion of the car is equipped with horizontally extending encircling straps 16 which extend around the major portion of the space to be occupied by the barrels to be loaded. These straps are suspended from the walls of the car by means of the vertical suspending straps 17 secured to the walls of the car by tacks or barbs 18. After the group of barrels has been placed within the car in close spaced relation as shown in Fig. 2, the encircling straps 16 are drawn inwardly around the ends of the load unit and, after being stretched taut by the operation of a suitable stretching device, the overlapping ends are secured together by means of seals 19 or other suitable fastening means, thus holding the group of barrels in compact assembled relation and thus forming a composite load unit which is spaced from the side walls and from the end walls of the car as shown at 20 to a sufficient extent to permit a limited sliding movement of the load unit on the floor of the car. In the arrangement shown in Fig. 2, the lower ends of the suspending straps 17 move inwardly toward the barrels when the encircling straps 16 are tightened and sealed and the nails 18 remain in place so that during the shipment of the load the encircling straps 16 are prevented from slipping down on the barrels by the straps 17 secured to the car walls. The limited movements of the load unit which take place during the movement of the car are not sufficient to detach the suspending straps 17 from the car walls.

The method of attaching the suspending straps 17 to the encircling straps 16 is illustrated particularly in Figs. 3 and 4 where the vertical suspending strap 17 is shown as being provided at its lower end with a loop 17ᵃ which extends around the lowermost encircling strap 16. The upturned end of the looped strap contacts with the body portion of the strap and is secured thereto by means of a seal 21. At the point where the upper encircling strap 16 is located, a short strip of similar strap 22 is applied to the strap 17 and secured thereto above and below the adjacent strap 16 by means of other seals 23, thus forming a loop in which the strap 16 is mounted and permitted to slide. In this way, any desired number of encircling straps 16 may be supported on any suitable number of suspending straps 17 distributed around the side walls and the end wall of the car.

In Fig. 5 of the drawings, there is illustrated a modification or extension of the invention of the present application according to which the interior of the railway car 25 is loaded with a group of barrels 26 secured in a load unit by means of encircling straps 27 having their overlapping ends secured together by means of seals 28 after they have been stretched taut. In this case, the suspending straps 29, instead of being allowed to remain attached to the car walls after the encircling straps 27 have been drawn inwardly around the group of barrels, are detached from the car walls and secured to the heads of the barrels 26 by means of nails 30, thus causing the barrels themselves to form the support for the encircling straps 27. It will be understood that the straps 29 are secured to the straps 27 in the manner illustrated in Figs. 3 and 4 or in any other suitable way.

In Fig. 6 of the drawings there is illustrated another extension of the idea of the present invention, illustrating the adaptation of the improvement to the loading of a group of rolls or bales of paper 35 which are located in a group in the end of the car 36 and which are held in assembled relation to form a compact load unit by means of a pair of encircling straps 37 having their overlapping ends secured together by means of seals 38 after they have been stretched taut. This group of rolls of paper, like the other load units previously described, is arranged so that the outer edges of the group are spaced from the car walls to permit a limited relative movement of the load unit with respect to the walls and the straps 37 are held in place by suspending straps. In this embodiment, the suspending straps 39, which may be tacked or nailed to the car wall in order to hold the straps 37 in position during the loading of the car, are turned inwardly over the load unit, after the straps 37 have been tightened, and the inner overlapping ends of the straps 39 are secured together by means of seals 40, thus forming a sort of harness which merely rests on the group of paper rolls and retains the encircling straps 37 in position.

Although certain embodiments of the invention have been shown and described by way of illustration, it will be understood that it may be constructed in various other embodiments within the scope of the appended claims.

We claim:

1. The method of loading a freight car which consists in arranging a plurality of load elements in a group, securing a flexible member around said group of load elements, and holding said flexible member in place by suspending straps.

2. The method of loading a freight car which consists in arranging a plurality of load elements in a group, passing a flexible member around said load elements, drawing said flexible member taut and securing the ends thereof to hold said load element in assembled relation, and preventing downward movement of said flexible member after it has been drawn taut by upwardly extending supporting flexible members.

3. The method of loading a freight car which consists in arranging an encircling flexible member around the space to be occupied by the load, supporting said flexible member above the floor of the car by flexible supporting means having the upper portions thereof attached to the car walls, placing a group of separate load elements in close relation in said space within said encircling flexible member, and then drawing and securing said flexible member in taut condition around said group of load elements.

4. The method of loading a freight car which consists in arranging a plurality of encircling flexible members around the space to be occupied by the load, supporting said flexible members above the floor of the car and spacing them apart by means of upwardly extending supporting flexible members, placing a group of separate load elements in close relation in said space within said encircling flexible members, and then drawing and securing said encircling flexible members in taut condition around said group of load elements while retaining the supporting function of said flexible members.

5. The method of loading a freight car which consists in arranging an encircling flexible member around the space to be occupied by the load, suspending said flexible member from the walls of the car by means of upwardly extending flexible members, placing a group of closely arranged load elements within said encircling flexible member and then drawing and securing said encircling member in taut condition and thereby moving the lower parts of said suspending flexible members inwardly from the car walls.

6. The method of loading a freight car which consists in arranging a plurality of load elements in a group, passing a flexible member around said load elements, drawing said flexible member taut and securing the ends thereof to hold said load elements in close relation, and holding said encircling flexible member from downward movement by supporting means extending over said load unit.

7. The method of loading a freight car which consists in arranging an encircling flexible member in the car around the space to be occupied by the load, placing in said space a group of closely arranged load elements, supporting said encircling flexible member from the car walls during the loading of said elements by means of upwardly extending supporting members attached to the car walls, drawing said encircling flexible member taut and securing the ends thereof after the load elements are in place, and then detaching said suspending members from the car walls and securing them to said load elements.

8. The method of loading a freight car which consists in arranging an encircling flexible member in the car around the space to be occupied by the load, supporting said flexible member above the floor of the car by means of flexible suspending members attached to the car walls at their upper ends, placing a plurality of closely arranged load units within said space, drawing said encircling flexible member taut and securing the ends thereof to hold said load elements in close spaced relation, and then bending said flexible suspending members over the top of the load unit thus formed and securing oppositely disposed suspending members together above the load unit.

9. A bulkbinding stay, comprising means for holding and spacing a plurality of binding straps, means for securing said stay to a car wall, and a flexible portion to conform to the shape of the bulk bound.

In testimony whereof, we have subscribed our names.

CHESTER M. MACCHESNEY.
JOHN EKERN OTT.